US008993078B2

(12) United States Patent
Niu et al.

(10) Patent No.: US 8,993,078 B2
(45) Date of Patent: Mar. 31, 2015

(54) COMPOSITIONS AND THEIR USE

(75) Inventors: Bor-Jiunn Niu, San Diego, CA (US); Haigang Chen, San Diego, CA (US); Lisa A. Underwood, Escondido, CA (US); Joanna G. Pool, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 13/982,227

(22) PCT Filed: Jan. 29, 2011

(86) PCT No.: PCT/US2011/023078
§ 371 (c)(1),
(2), (4) Date: Jul. 26, 2013

(87) PCT Pub. No.: WO2012/102737
PCT Pub. Date: Aug. 2, 2012

(65) Prior Publication Data
US 2013/0309424 A1    Nov. 21, 2013

(51) Int. Cl.
*B41M 5/40* (2006.01)
*B41M 5/52* (2006.01)
*C08F 222/06* (2006.01)
*C08L 23/04* (2006.01)
*B41M 5/50* (2006.01)
*C09J 133/08* (2006.01)
*B32B 37/12* (2006.01)

(52) U.S. Cl.
CPC ............ *B41M 5/5254* (2013.01); *C08F 222/06* (2013.01); *C08L 23/04* (2013.01); *B41M 5/504* (2013.01); *C09J 133/08* (2013.01); *B32B 37/1284* (2013.01); *B41M 5/502* (2013.01)
USPC ..................... 428/32.23; 428/32.38

(58) Field of Classification Search
CPC ............................... C08F 222/06; C08L 23/04
USPC .......................................... 428/32.23, 32.38
See application file for complete search history.

(56) References Cited

U.S. PATENT DOCUMENTS

| | | |
|---|---|---|
| 4,167,507 A | 9/1979 | Haaf |
| 5,712,041 A | 1/1998 | Breant et al. |
| 5,912,085 A | 6/1999 | Ito et al. |
| 6,054,007 A | 4/2000 | Boyd et al. |
| 6,068,897 A | 5/2000 | Adur et al. |
| 6,106,982 A | 8/2000 | Mientus et al. |
| 6,117,552 A | 9/2000 | Hanada et al. |
| 6,159,605 A | 12/2000 | Hanada et al. |
| 6,162,860 A | 12/2000 | Anderson et al. |
| 6,177,197 B1 | 1/2001 | Imashiro et al. |
| 6,316,120 B1 | 11/2001 | Emslander |
| 6,372,841 B1 | 4/2002 | Anderson et al. |
| 6,451,911 B1 | 9/2002 | Bertin et al. |
| 6,465,078 B1 | 10/2002 | Kawai et al. |
| 6,531,231 B1 | 3/2003 | Ito et al. |
| 6,589,636 B2 | 7/2003 | Emslander et al. |
| 6,592,971 B2 | 7/2003 | Ochiai et al. |
| 6,620,469 B2 | 9/2003 | Totani et al. |
| 6,623,841 B1 | 9/2003 | Venkatasanthanam et al. |
| 6,720,042 B2 | 4/2004 | Ylitalo et al. |
| 6,800,341 B2 | 10/2004 | Emslander et al. |
| 6,857,737 B2 | 2/2005 | Emslander et al. |
| 6,878,423 B2 | 4/2005 | Nakanishi |
| 7,714,072 B2 | 5/2010 | Michie et al. |
| 2001/0009712 A1 | 7/2001 | Totani et al. |
| 2003/0044625 A1* | 3/2003 | Goto .............................. 428/480 |
| 2003/0171480 A1 | 9/2003 | Egolf et al. |
| 2006/0014022 A1 | 1/2006 | Kendig et al. |
| 2006/0122311 A1 | 6/2006 | Kim et al. |
| 2006/0222789 A1 | 10/2006 | Dontula et al. |
| 2006/0257652 A1 | 11/2006 | Su |
| 2007/0054070 A1 | 3/2007 | Laney et al. |
| 2007/0218228 A1 | 9/2007 | Kwok et al. |
| 2008/0166507 A1 | 7/2008 | Park et al. |
| 2008/0220353 A1 | 9/2008 | Dontula et al. |

(Continued)

FOREIGN PATENT DOCUMENTS

| | | |
|---|---|---|
| CA | 2309953 C | 6/1999 |
| CN | 1435457 A | 8/2003 |
| CN | 101588928 A | 11/2009 |
| EP | 0874872 B1 | 4/2001 |
| EP | 1153974 A1 | 11/2001 |
| JP | 2000282375 A | 10/2000 |
| WO | 9722655 A1 | 6/1997 |

(Continued)

OTHER PUBLICATIONS

International Search Report and the Written Opinion (ISR/WO) of the International Searching Authority (ISA/KR) for counterpart PCT Application No. PCT/US2011/023078, dated Oct. 28, 2011, 12 pages.
State Intellectual Property Office of People's Republic of China Search Report (CNSR) dated May 6, 2014—English translation (2 pages) for CN counterpart appln. No. 201180066167.2.

*Primary Examiner* — Betelhem Shewareged
(74) *Attorney, Agent, or Firm* — North Shore Associates

(57) ABSTRACT

A composition includes a mixture including a first polymer and a second polymer. The first polymer includes methyl acrylate or ethyl acrylate residues in an amount of about 15% to about 25% by weight of the first polymer, maleic anhydride residues in an amount of about 2% to about 3.5% by weight of the first polymer, and ethylene residues. The second polymer includes butyl acrylate residues in an amount of about 5% to about 10% by weight of the second polymer, maleic anhydride residues in an amount of about 3% to about 4% by weight of the second polymer, and ethylene residues. An amount of the first polymer in the mixture is about 60% to about 90% by weight. The mixture may further include a pigment-LDPE composition wherein the amount of the first polymer in the mixture is about 50% to about 70% by weight.

19 Claims, 7 Drawing Sheets

(56) References Cited

U.S. PATENT DOCUMENTS

| | | |
|---|---|---|
| 2008/0274245 A1 | 11/2008 | Lee et al. |
| 2009/0011263 A1 | 1/2009 | Forloni |
| 2009/0092828 A1 | 4/2009 | Meijlink |
| 2009/0297857 A1 | 12/2009 | Pascal et al. |
| 2010/0015423 A1 | 1/2010 | Schaefer et al. |
| 2010/0099817 A1 | 4/2010 | Bizet et al. |
| 2010/0112256 A1 | 5/2010 | Bonnet et al. |
| 2011/0012974 A1 | 1/2011 | Niu |

FOREIGN PATENT DOCUMENTS

| | | |
|---|---|---|
| WO | 9924485 A2 | 5/1999 |
| WO | 0018836 A1 | 4/2000 |
| WO | 2012047203 A1 | 4/2012 |

* cited by examiner

COMPOSITIONS AND THEIR USE

CROSS-REFERENCE TO RELATED APPLICATIONS

N/A

STATEMENT REGARDING FEDERALLY SPONSORED RESEARCH OR DEVELOPMENT

N/A

BACKGROUND

The present disclosure relates to polymeric compositions, which may find use as adhesion compositions, and methods of preparing printing media using the polymeric compositions.

Inkjet printers are now very common and affordable and allow one to economically obtain decent print quality and print durability at relatively high speed. They are used in home printing, office printing and commercial printing. Inkjet printers are utilized to print on a number of different media.

Because of the many positive aspects of inkjet printing, it is desirable to use inkjet printing to print on thin planar films that are employed for displays, particularly commercial displays. The thin planar films used for such displays have many different compositions to provide for the use of a wide range of inks most commonly used in inkjet printers, which are water-based or solvent-based but also include UV-curable inks. The thin planar films may be associated with a support layer, the components of which may include hydrophobic substrates. In many examples, an adhesion layer is employed to bind the thin planar film to the support and also to bind other members of the support. The existing compositions for binding the thin planar film to the support provide less than desirable adherence strength between the two, especially when the support comprises a hydrophobic material.

BRIEF DESCRIPTION OF THE DRAWINGS

The drawings provided herein are not to scale and are provided for the purpose of facilitating the understanding of certain examples in accordance with the principles described herein and are provided by way of illustration and not limitation on the scope of the appended claims.

DETAILED DESCRIPTION

Figure 1A:
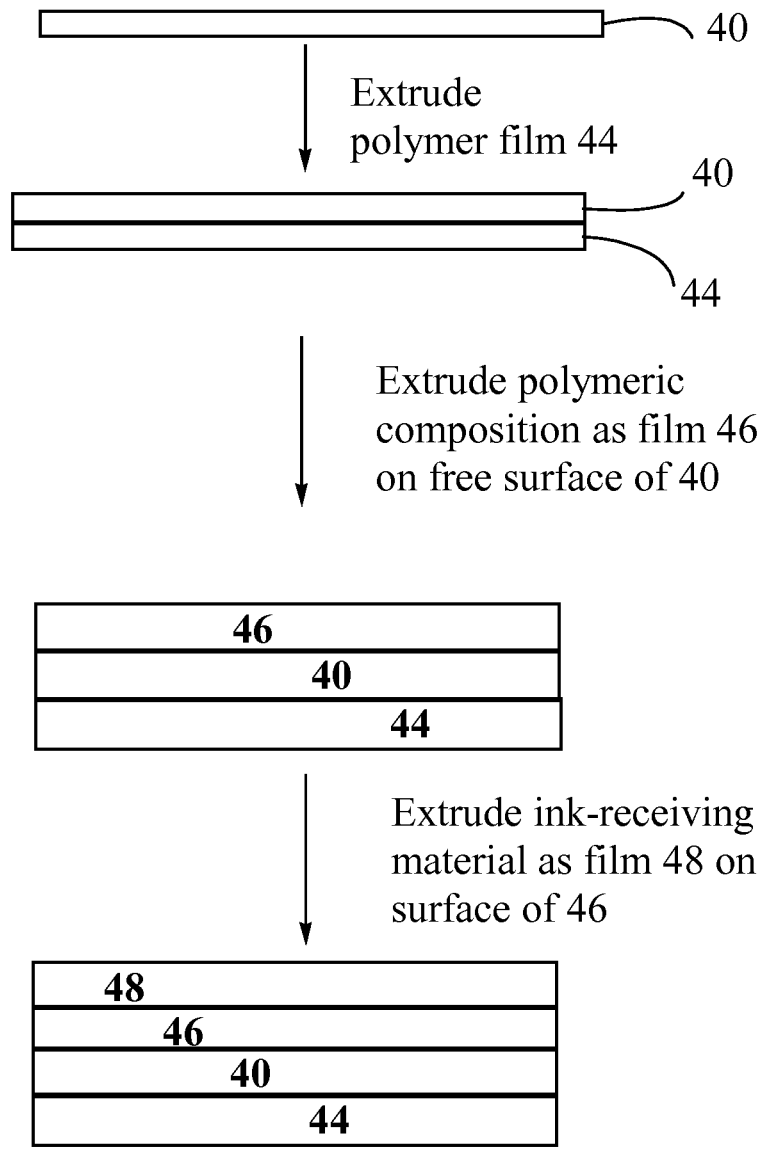
FIG. 1A is a diagram illustrating a method of preparing an ink-printable composition according to an example in accordance with the principles described herein.

Some examples in accordance with the principles described herein are directed to a composition comprising a mixture that comprises a first polymer and a second polymer. The first polymer comprises methyl acrylate residues or ethyl acrylate residues in an amount of about 15% to about 25% by weight of the first polymer, maleic anhydride residues in an amount of about 2% to about 3.5% by weight of the first polymer, and ethylene residues in an amount to satisfy the remaining percentage of the first polymer. The second polymer comprises butyl acrylate residues in an amount of about 5% to about 10% by weight of the second polymer, maleic anhydride residues in an amount of about 3% to about 4% by weight of the second polymer, and ethylene residues in an amount to satisfy the remaining percentage of the second polymer. By 'remaining percentage' it is meant an amount in percent by weight that when added to the recited percentages by weight, or ranges of thereof, equals 100% of the respective polymer. In some examples, an amount of the first polymer in the mixture is about 60% to about 90% by weight. In some examples, an amount of the first polymer in the mixture is about 75% to about 85% by weight. In some examples, an amount of the first polymer in the mixture is about 80% by weight.

Examples of the above compositions may be employed in any situation where one material is bonded or adhered to another material and accordingly, may be referred to in such exemplary uses as adhesion compositions. Examples of the above compositions may be employed in place of other bonding materials in a broad array of applications including, by way of illustration and not limitation, laminating one material to another material, extruding one material on another material, coating one material on another, and co-extruding two or more layers, for example.

Some examples in accordance with the principles described herein are directed to an ink-printable composition, which comprises a planar scrim having a first side and a second side, a polymer layer on the first side of the planar scrim, an adhesion component on one or both of the first side and the second side of the planar scrim, and a film of an ink-receiving material on at least the adhesion component on the second side of the planar scrim. The adhesion component results from a polymeric composition that comprises a mixture of a first polymer and a second polymer as described above. In some examples, an amount of the first polymer in the mixture is about 60% to about 90% by weight. In some examples, an amount of the first polymer in the mixture is about 75% to about 85% by weight. In some examples, an amount of the first polymer in the mixture is about 80% by weight.

Some examples in accordance with the principles described herein are directed to a method of preparing an ink-printable composition. An adhesion component is formed on one or both of a first side and a second side of a support comprising the planar scrim. An ink-receiving material is formed on at least a surface of the adhesion component. The adhesion component results from a polymeric composition that comprises a mixture of a first polymer and a second polymer as described above.

The ink-printable compositions comprising the ink-receiving material bonded to a support by means of (i.e., using) the aforementioned compositions exhibit excellent interfacial adhesion after manufacturing extrusion coating processes especially where the support comprises a hydrophobic material. The phrase "excellent interfacial adhesion" as used above means that examples of the adhesion compositions in accordance with the principles described herein provide for bonding to an ink-receiving layer and bonding to a hydrophobic support with a ranking, as described further below, of about 2 or less (out of 5) in adhesion tests, examples of which are set forth below by way of illustration and not limitation.

As mentioned above, in accordance with the principles described herein, the composition comprises a mixture of polymers. The polymers may be linear or branched or a combination thereof. A linear polymer comprises a linear chain of atoms and a branched polymer comprises a branched chain of atoms. The relationship of the different monomer residues in the polymer may be random, alternating, periodic, grafted or block, for example, or a combination of two or more thereof.

The phrase "monomer residue" as used herein refers to a structural unit or building block or repeat unit of a polymer and is derived from a monomer in that the end polymer is the result of the polymerization of the monomer. For example, by way of illustration and not limitation, a monomer that comprises an unsaturation that is a double bond between carbon atoms, when polymerized, results in monomer residues in a polymer where the monomer residues comprise a single bond between the two carbon atoms, the double bond thus becoming saturated during the polymerization process. The monomer residues are not the monomer itself but are derived from the monomer.

Each of the polymers comprises about 100 to about 500,000 or more monomer residues, or about 100 to about 400,000 or more monomer residues, or about 100 to about 300,000 or more monomer residues, or about 100 to about 200,000 or more monomer residues, or about 100 to about 100,000 or more monomer residues, or about 500 to about 200,000 monomer residues, or about 500 to about 100,000 monomer residues, or about 1,000 to about 100,000 monomer residues, or about 2,000 to about 100,000 monomer residues, or about 1,000 to about 50,000 monomer residues, or about 5,000 to about 50,000 monomer residues, for example. One or more of the adhesion properties of the adhesion (polymeric) composition and the melting index of the polymer is influenced by the number of monomer residues and the monomer inherent chemistry, for example. It is a characteristic of the present examples in accordance with the principles described herein that the polymeric composition can be tailored to a particular ink-receiving layer material and a particular support material, for example, by adjusting the weight percentage of the monomer residues in the polymers that are employed to prepare the adhesion composition and also by adjusting the weight percentages of the first and second polymers in the mixture.

In some examples the average molecular weight (grams/mole) of the polymer is about 1,000 to about 1,000,000 or more, or about 5,000 to about 1,000,000, or about 10,000 to about 900,000, or about 100,000 to about 900,000, or about 1,000 to about 750,000, or about 1,000 to about 500,000, or about 10,000 to about 500,000, or about 100,000 to about 500,000, for example.

At least one of the polymers (arbitrarily referred to herein as a first polymer) of the polymeric composition in accordance with the principles described herein is a polymer comprising methyl acrylate residues or ethyl acrylate residues, maleic anhydride residues, and ethylene residues.

A percentage by weight of methyl acrylate residues or ethyl acrylate residues in the first polymer is about 15% to about 25%, or about 15% to about 24%, or about 15% to about 23%, or about 15% to about 22%, or about 15% to about 21%, or about 15% to about 20%, or about 15% to about 19%, or about 15% to about 18%, or about 15% to about 17%, or about 15% to about 16%, or about 16% to about 25%, or about 16% to about 24%, or about 16% to about 23%, or about 16% to about 22%, or about 16% to about 21%, or about 16% to about 20%, or about 16% to about 19%, or about 16% to about 18%, or about 16% to about 17%, or about 17% to about 25%, or about 17% to about 24%, or about 17% to about 23%, or about 17% to about 22%, or about 17% to about 21%, or about 17% to about 20%, or about 17% to about 19%, or about 17% to about 18%, or about 18% to about 25%, or about 18% to about 24%, or about 18% to about 23%, or about 18% to about 22%, or about 18% to about 21%, or about 18% to about 20%, or about 18% to about 19%, or about 19% to about 25%, or about 19% to about 24%, or about 19% to about 23%, or about 19% to about 22%, or about 19% to about 21%, or about 19% to about 20%, or about 20% to about 25%, or about 20% to about 24%, or about 20% to about 23%, or about 20% to about 22%, or about 20% to about 21%, for example.

A percentage by weight of maleic anhydride residues in the first polymer is about 2% to about 3.5%, or about 2% to about 3.4%, or about 2% to about 3.3%, or about 2% to about 3.2%, or about 2% to about 3.1%, or about 2% to about 3.0%, or about 2% to about 2.9%, or about 2% to about 2.8%, or about 2% to about 2.7%, or about 2% to about 2.6%, or about 2% to about 2.5%, or about 2% to about 2.4%, or about 2% to about 2.3%, or about 2% to about 2.2%, or about 2% to about 2.1%, or about 2.5% to about 3.5%, or about 2.5% to about 3.4%, or about 2.5% to about 3.3%, or about 2.5% to about 3.2%, or about 2.5% to about 3.1%, or about 2.5% to about 3.0%, or about 2.5% to about 2.9%, or about 2.5% to about 2.8%, or about 2.5% to about 2.7%, or about 2.5% to about 2.6%, for example. In some examples, the maleic anhydride residues are present in the polymer in a non-grafted manner, which means that the maleic anhydride residues are included during the main chain polymerization process and not added after the main chain polymerization.

A percentage by weight of ethylene residues in the first polymer is dependent upon the weight percentage of the methyl acrylate residues or the ethyl acrylate residues and of the maleic anhydride residues in the first polymer. In some examples the weight percentage of ethylene residues in the first polymer is about 71.5% to about 83%, or about 71.5% to about 80%, or about 71.5% to about 75%, or about 72% to about 83%, or about 72% to about 80%, or about 72% to about 75%, or about 73% to about 83%, or about 73% to about 80%, or about 73% to about 75%, or about 74% to about 83%, or about 74% to about 80%, or about 74% to about 75%, for example.

In some examples in accordance with the principles described herein the first polymer has a melt index number of about 3 to about 90, or about 3 to about 80, or about 3 to about 70, or about 15 to about 90, or about 15 to about 80, or about 15 to about 70, or about 20 to about 90, or about 20 to about 80, or about 20 to about 70, or about 40 to about 90, or about 40 to about 80, or about 50 to about 90 or about 50 to about 80, for example. In some embodiments in accordance with the principles disclosed herein the melt index of the first polymer is about 3 to about 50, or about 3 to about 40, or about 3 to about 30, or about 3 to about 20, or about 3 to about 10, or about 5 to about 30, or about 5 to about 25, or about 5 to about 20, or about 5 to about 15, or about 10 to about 50, or about 10 to about 40, or about 10 to about 30, or about 10 to about 20, or about 15 to about 30, or about 15 to about 20, for example.

In some examples in accordance with the principles described herein, the first polymer comprises ethylene residues in an amount of about 77% to about 80.5% by weight, ethyl acrylate residues in an amount of about 17% to about 20% by weight, and maleic anhydride residues in an amount of about 2.7% to about 2.9% by weight. In some examples in accordance with the principles described herein, the first polymer may be commercially available. Examples, by way of illustration and not limitation, of commercially available polymers that are suitable as the first polymer include LOTADER® 5500 terpolymer (Arkema Canada, Inc., Bécancour, Québec) (composition of 77.2% ethylene residues, 20% ethyl acrylate residues and 2.8% maleic anhydride residues with melt index number at 20), for example. As indicated above, other percentages of ethylene residues, either methyl acrylate residues or ethyl acrylate residues, and maleic anhydride residues in the first polymer may be employed.

At least one of the polymers (arbitrarily referred to herein as a second polymer) of the polymeric composition in accordance with the principles described herein comprises butyl acrylate residues in an amount of about 5% to about 10% by weight of the second polymer, maleic anhydride residues in an amount of about 3% to about 4% by weight of the second polymer, and ethylene residues.

A percentage by weight of butyl acrylate residues in the second polymer is about 5% to about 10%, or about 5% to about 9%, or about 5% to about 8%, or about 5% to about 7%, or about 5% to about 6%, or about 6% to about 10%, or about 6% to about 9%, or about 6% to about 8%, or about 6% to about 7%, or about 7% to about 10%, or about 7% to about 9%, or about 7% to about 8%, or about 8% to about 10%, or about 8% to about 9%, or about 9% to about 10%, for example.

A percentage by weight of maleic anhydride residues in the second polymer is about 2% to about 4%, or about 3.0% to about 4.0%, or about 3.1% to about 4%, or about 3.2% to about 4%, or about 3.3% to about 4%, or about 3.4% to about 4%, or about 3.5% to about 4%, or about 3.6% to about 4%, or about 3.7% to about 4%, or about 3.8% to about 4%, or about 3.9% to about 4%, or about 3% to about 3.9%, or about 3% to about 3.8%, or about 3% to about 3.7%, or about 3% to about 3.6%, or about 3% to about 3.5%, or about 3% to about 3.4%, or about 3% to about 3.3%, or about 3% to about 3.2%, or about 3% to about 3.1%, for example. In some examples, the maleic anhydride residues are present in the polymer in a non-grafted manner.

A percentage by weight percentage of ethylene residues in the second polymer is dependent upon the weight percentage of the butyl acrylate residues and of the maleic anhydride residues in the second polymer. In some examples the weight percentage of ethylene residues in the first polymer is about 86% to about 92%, or about 86% to about 91%, or about 86% to about 90%, or about 86% to about 89%, or about 86% to about 88%, or about 86% to about 87%, or about 87% to about 92%, or about 87% to about 91%, or about 87% to about 90%, or about 87% to about 89%, or about 87% to about 88%, or about 88% to about 92%, or about 88% to about 91%, or about 88% to about 90%, or about 88% to about 89%, or about 89% to about 92%, or about 89% to about 91%, or about 89% to about 90%, or about 90% to about 92%, or about 90% to about 91%, or about 91% to about 92%, for example.

In some examples in accordance with the principles described herein the second polymer has a melt index number of about 5 to about 15, or about 5 to about 10, or about 6 to about 15, or about 6 to about 10, or about 7 to about 15, or about 7 to about 10, or about 8 to about 15, or about 8 to about 10, or about 5 to about 12, or about 5 to about 9, or about 5 to about 8, or about 9 to about 15, or about 9 to about 14, or about 9 to about 13, or about 9 to about 12, or about 10 to about 15, or about 10 to about 13, or about 11 to about 15, or about 11 to about 14, or about 12 to about 15, for example.

In some examples in accordance with the principles described herein, the second polymer comprises ethylene residues in an amount of about 90% to about 91% by weight, butyl acrylate residues in an amount of about 5% to about 7% by weight, and maleic anhydride residues in an amount of about 3.0% to about 4.0% by weight. In some examples the second polymer may be commercially available. One example, by way of illustration and not limitation, of a commercially available polymer that is suitable as the second polymer is LOTADER® 4210 terpolymer (Arkema Canada, Inc.). The composition of LOTADER® 4210 terpolymer is 90.2% of ethylene residues, 6% of butyl acrylate residues and 3.8% of maleic anhydride residues with a melt index number at 9. Another example, by way of illustration and not limitation, of a commercially available polymer that is suitable as the second polymer is LOTADER® 3210 terpolymer (Arkema Canada, Inc.). The composition of LOTADER® 3210 terpolymer is 90.9% of ethylene residues, 6% of butyl acrylate residues and 3.1% of maleic anhydride residues with a melt index number at 5. As indicated above, other percentages of ethylene residues, butyl acrylate residues and maleic anhydride residues in the second polymer may be employed.

The polymers utilized in examples in accordance with the principles described herein also may be obtained by polymer synthesis from appropriate monomers or monomer residue precursors or some of the polymers may be obtained commercially. The term "monomer" or "monomer unit" means a molecule capable of undergoing polymerization to form a polymer. A "monomer residue precursor" is a monomer that results in the desired monomer residue by additional treatment after polymerization.

Examples of approaches for preparing polymers, by way of illustration and not limitation, include emulsification or emulsion polymerization, free radical polymerization, bulk polymerization, transition metal catalyzed coupling, condensation (step-growth) polymerization, living polymerization, living radical polymerization, addition (chain reaction) polymerization (anionic, etc.), coordination polymerization, ring opening polymerization, solution polymerization, plasma polymerization, radical polymerization, atom transfer radical polymerization, and reversible addition fragmentation, for example.

The mixture of polymers that form the polymeric composition is a physical mixture obtained by mixing the polymers together. Mixing may be accomplished by such methods that include, but are not limited to, blending a mixture of pre-dried individual polymer pellets in a mixing hopper or by compounding a mixture of pre-dried individual polymer pellets into a single pellet, for example. The extent of one or both of mixing and compounding should be sufficient to provide for one or both of uniform performance during use of the polymeric composition and uniformity of the product comprising an adhesion component produced from the polymeric composition.

A percentage by weight of the first polymer in the polymeric composition is about 60% to about 90%, or about 60% to about 85%, or about 60% to about 80%, or about 60% to about 75%, or about 60% to about 70%, or about 60% to about 65%, or about 65% to about 90%, or about 65% to about 85%, or about 65% to about 80%, or about 65% to about 75%, or about 65% to about 70%, or about 70% to about 90%, or about 70% to about 85%, or about 70% to about 80%, or about 70% to about 75%, or about 80% to about 90%, or about 80% to about 85%, for example.

As mentioned above, the percentage of the first polymer and the second polymer in the polymeric composition is based on weight, that is, the weight of the first polymer and the total weight of the combined polymers (in this example, first and second polymers). In some examples the percentage of the first polymer in the adhesion composition is in the range of about 60% to about 90% with the corresponding range of the second polymer of about 40% to about 10%. In some examples the percentage of the first polymer in the adhesion composition is in the range of about 75% to about 85% with the corresponding range of the second polymer of about 25% to about 15%. In some examples the percentage of the first polymer in the adhesion composition is about 80% with the corresponding percentage of the second polymer of about 20%.

A percentage by weight of the second polymer in the composition is dependent on the percentage of the first polymer in the composition and the percentage of any other materials, which include, but are not limited to, fillers, pigments, colorants, processing aids, and performance aids, for example. A percentage by weight of the second polymer in the polymeric composition is about 40% to about 10%, or about 40% to about 15%, or about 40% to about 20%, or about 40% to about 25%, or about 40% to about 30%, or about 40% to about 45%, or about 35% to about 10%, or about 35% to about 15%, or about 35% to about 20%, or about 35% to about 25%, or about 35% to about 30%, or about 30% to about 10%, or about 30% to about 15%, or about 30% to about 20%, or about 30% to about 25%, or about 20% to about 10%, or about 20% to about 15%, for example.

In some examples in accordance with the principles described herein, the polymeric composition may include one or more additional materials such as, for example, additives such as fillers, pigments such as, e.g., $TiO_2$, $CaCO_3$, clay, and $SiO_2$, colorants, processing aids, and performance aids, as mentioned above. In an example, the additives are added to the mixture before the mixture is processed such as by, for example, an extrusion process either during the initial mixture preparation or in a separate mixing step.

In some examples in accordance with the principles described herein, a polymeric composition comprises a mixture comprising (i) a first polymer that comprises methyl acrylate residues or ethyl acrylate residues in an amount of about 15% to about 25% by weight of the first polymer, maleic anhydride residues in an amount of about 2% to about 3.5% by weight of the first polymer, and ethylene residues; (ii) a second polymer comprising butyl acrylate residues in an amount of about 5% to about 10% by weight of the second polymer, maleic anhydride residues in an amount of about 3% to about 4% by weight of the second polymer, and ethylene residues; and (iii) a composition comprising a pigment such as, for example, $TiO_2$, $CaCO_3$, clay and $SiO_2$, compounded with low density polyethylene (LDPE) (also referred to herein as the 'pigment-LDPE composition'). Polymeric compositions comprising the above components exhibit enhanced adhesion to a scrim and the maintenance of good adhesion to an ink-receiving layer of an ink printable composition as well as improved opacity and a reduction in the cost of manufacture.

The pigment-LDPE composition may comprise about 30% to about 80%, or about 30% to about 70%, or about 30% to about 60%, or about 40% to about 80%, or about 40% to about 75%, or about 40% to about 70%, or about 40% to about 65%, or about 40% to about 60%, or about 50% to about 80%, or about 50% to about 75%, or about 50% to about 70%, or about 60% to about 80%, of pigment (percentage above by weight). The total amount of additives such as fillers, pigments, colorants, processing aids, and performance aids in the pigment-LDPE composition is about 80% or less, or about 70% or less, or about 65% or less, or about 60% or less, or about 50% or less, or about 40% or less, for example (percentage above by weight).

The amount of the first polymer in the above polymeric composition is about 50% to about 75%, or about 50% to about 70%, or about 50% to about 65%, or about 50% to about 60%, or about 55% to about 75%, or about 55% to about 70%, or about 55% to about 65%, or about 60% to about 75%, or about 60% to about 70%, or about 65% to about 75%, or about 65% to about 70% (percentage above by weight). The amount of the second polymer in the above polymeric composition is about 10% to about 30%, or about 10% to about 25%, or about 10% to about 20%, or about 10% to about 15%, or about 15% to about 30%, or about 15% to about 25%, or about 15% to about 20%, or about 20% to about 30%, or about 20% to about 25% (percentage above by weight). The amount of the pigment-LDPE composition in the above polymeric composition is about 5% to about 30%, or about 5% to about 25%, or about 5% to about 20%, or about 5% to about 15%, or about 10% to about 30%, or about 10% to about 25%, or about 10% to about 20%, or about 10% to about 15%, or about 15% to about 30%, or about 15% to about 25%, or about 15% to about 20%, or about 20% to about 30%, or about 20% to about 25%, or about 25% to about 30% (percentage above by weight).

In one example in accordance with the principles described herein, the pigment-LDPE composition is $TiO_2$-LDPE comprising about 65% to about 75% of $TiO_2$ by weight and the amount of the first polymer in the above polymeric composition is about 62% to about 66% by weight, the amount of the second polymer in the above polymeric composition is about 14% to about 18% by weight and the amount of the $TiO_2$-LDPE composition in the above polymeric composition is about 18% to about 22% by weight. In one example in accordance with the principles described herein wherein the pigment is $TiO_2$, a percentage by weight of the first polymer in the above polymeric composition is about 64%, a percentage by weight of the second polymer is about 16%, and a percentage by weight of the $TiO_2$/LDPE composition is about 20%.

As mentioned above, some examples in accordance with the principles described herein are directed to ink-printable compositions. An ink-printable composition is one that includes a feature that is capable of receiving and retaining ink that is applied to the feature such as, for example, ink that is applied to, e.g., printed on, the feature of the ink-printable composition. This feature should have one or both of good affinity and good compatibility for the ink that is applied to the feature. The feature should also permit relatively fast drying of the ink that is applied. The feature of the ink-printable composition that accomplishes this purpose is referred to herein as an ink-receiving material. In some examples in accordance with the principles described herein, the ink-receiving material may include one or more additives such as fillers, pigments, processing aids, and performance aids, for example.

The ink-receiving material may be formed from a solution-coated ink-receiving material-forming composition or an extrudable ink-receiving material-forming composition, which may be, for example, a polymeric composition comprising one or more polymers such as, for example, polyolefins, polyesters, polyamides, ethylene copolymers, polycarbonates, polyurethanes, polyalkylene oxides, polyester amides, polyalkyloxazolines, polyphenyl oxazolines, polyethylene-imines, polyvinyl pyrrolidones, and combinations of two or more of the above. The polymers of the ink-receiving composition, by way of illustration and not limitation, may include polyvinyl acetate, ethylene-vinyl acetate copolymer, a hydrolyzed copolymer of ethylene and vinyl acetate, poly ethylene-acrylates, poly ethylene-methacrylates, polyacrylates, polymethacrylates, polyvinyl alcohols, poly(2-ethyl-2-oxazoline), styrene-maleic acid copolymer, styrene-butadiene copolymers, polyethylene oxides, polyvinyl acetals, polyvinyl pyrrolidones, poly methylmethacrylates, poly butylacrylates, poly isobutylmethacrylates, polyacrylic acid, polymethacrylic acid, polylactic acid, for example, and combinations of two or more of the above.

The thickness of the ink-receiving material depends on one or more of the nature of the ink-receiving material, the nature of the adhesion component, and the physical form of the adhesion component, for example. In some examples the thickness of the ink-receiving material in the form of a layer is about 0.5 to about 100 microns, or about 0.5 to about 75 microns, or about 0.5 to about 50 microns, or about 1 to about 100 microns, or about 1 to about 75 microns, or about 1 to about 50 microns, or about 5 to about 100 microns, or about 5 to about 75 microns, or about 5 to about 50 microns, or about 10 to about 100 microns, or about 10 to about 75 microns, or about 10 to about 50 microns, or about 25 to about 100 microns, or about 25 to about 75 microns, or about 25 to about 50 microns, or about 30 to about 100 microns, or about 30 to about 75 microns, or about 30 to about 50 microns, or about 35 to about 75 microns, or about 35 to about 50 microns, for example.

Some examples of the ink-printable compositions in accordance with the principles described herein comprise a support associated with the ink-receiving material. The support is any substance that provides one or more of structure and integrity to the ink-printable compositions so that the ink-printable compositions may be employed for their intended use. The ink-receiving material is associated with the support, which means that the relationship between the ink-receiving material and the support is one in which the ink-receiving material exhibits substantially non-removable adherence to the support. A polymeric composition, examples of which are set forth above, may be formed into an adhesion component, which may be a component of the support and is employed in the association of the ink-receiving material and the support. As mentioned above, the polymeric composition may be formed into an adhesion component and thus, the adhesion component may be said to "result from the polymeric composition." One or more layers of ink-receiving material may be associated with the support. The phrase "substantially non-removable adherence" means that the average peel force is equal to or greater than about 7 newtons per 50.8 mm wide strip with crosshead speed at 50.8 mm per minute measured by an Instron device (Instron Industrial Products, Grove City Pa.).

The support may comprise one or more components that provide for different functions within the ink-printable composition. The components may have any number of forms such as, but not limited to, layers, sheets, and films, for example. Examples, by way of illustration and not limitation, of components that may form part of the support include adhesion components, structure-providing components (substrates), scrims (woven and non-woven material), moisture barriers, vapor/air barriers and adhesion promoters, for example.

The support or one or more of the components of the support may be translucent, transparent, or opaque and may be of any color such as, for example, white or grey, depending on the end use of the ink-printable composition with a printed image thereon.

In some examples the one or more components of the support are in the form of layers associated with one another in a predetermined manner. The layers may be in the form of a film, sheet, woven scrim and non-woven scrim, for example. The phrase "non-woven scrim" refers to a layer that is not truly woven but rather pseudo woven, that is, the non-woven scrim has woven characteristics as the result of long fibers or filaments being bonded together by one or more of chemical treatment (including, e.g., solvent treatment), mechanical treatment (e.g., embossing), and heating.

In some examples the support comprises at least one structure-providing component or substrate, which provides additional physical integrity and form to the ink-printable composition. The nature of the substrate is dependent on one or more of an intended use of the ink-printable composition, a nature of the ink-receiving material, a designed tear strength, a designed tensile strength, a designed surface texture and a designed longevity, for example. The one or more substrates of the support may be fabricated from, for example, polyolefins, polyesters, polyurethanes, polyvinyl chlorides, polyamides, polystyrene, ethylene vinyl alcohol, polylactic acid, and cellulose and combinations of two or more of the above. In some examples, the substrates may be fabricated from polyethylene, polypropylene, polymethylpentene, polybutylene, polyethylene terephthalate, polystyrene, polyvinyl chloride, polyurethane, polyacrylate, polyvinyl acetate, polysulfone, polyvinylidene chloride, polyethylene methyl acrylate, polyethylene methacrylic acid, polyethylene ethyl acrylate, nylon, polyvinyl pyrillidone, polyether ester, polyether amide, polycarbonate, styrene acrylonitrile polymer, polymethyl methacrylates, cellulosics, fluoroplastics, acrylonitrile butadiene styrene polymer, polyethylenevinyl alcohol, and polylactic acid, and copolymers (two or more monomer residues) and combinations of two or more of the above.

The substrate may be in the form of an extruded film or layer, a woven layer (scrim), non-woven scrim, or paper, for example. In some examples, one or more of the substrates of examples of the present ink-printable compositions may be fabricated from polyethylene (PE), polypropylene (PP), polyethylene terephthalate (PET), ethylene vinyl acetate (EVA), polystyrene (PS), polycarbonate, and polyamide polymer and combinations of two or more of the above, for example. In an example of the present ink-printable composition, the substrate is fabricated from PE. In another example of the present ink-printable compositions, the substrate is fabricated from one or both of low density PE (LDPE) and high density PE (HDPE). In some examples one or more of the substrates is a woven layer (scrim) of one or both of LDPE and HDPE.

The thickness of the substrate depends on one or more of the physical form of the substrate (e.g., layer including, e.g., extruded layer, film including, e.g., extruded film, woven scrim, or non-woven scrim), the nature of the function of the substrate (for example, provide one or more of stiffness (rigidity), tear and tensile strength, opacity, longevity, and ability to be recycled), the nature of the ink-receiving material, the nature of the material with which the substrate is associated, for example. In some examples the thickness of the substrate in the form of a layer or a scrim is about 10 to about 500 microns, or about 25 to about 500 microns, or about 50 to about 500 microns, or about 100 to about 500 microns, or about 250 to about 500 microns, or about 10 to about 400 microns, or about 10 to about 300 microns, or about 10 to about 200 microns, or about 10 to about 100 microns, or about 50 to about 400 microns, or about 50 to about 300 microns, or about 50 to about 200 microns, or about 50 to about 100 microns, for example.

In some examples in accordance with the principles described herein, the support comprises one or both of a scrim and at least one substrate layer. The ink-receiving material is associated with a surface of the scrim or a surface of at least one substrate layer by means of examples of the polymeric composition discussed above.

As mentioned above, a polymeric composition is accordance with the principles described herein may be employed to provide substantially non-removable adherence of the ink-receiving material to the support. The nature of the polymeric composition is dependent on one or more of the composition of the ink-receiving material and of a component of the support to which the ink-receiving material is to be bonded or attached, for example. In some examples an adhesion component of the ink-printable composition results from the adhesion composition in accordance with the principles described herein by an extrusion process. In some examples, the polymeric component may be an extruded film or layer or co-extruded film or layer. In some examples an adhesion component of the ink-printable composition results from the polymeric composition in accordance with the principles described herein by a lamination process to attach an ink-receiving material and a support.

The thickness of an adhesion component depends on one or more of the nature of the ink-receiving material, the nature of the component of the support to which the adhesion layer binds, the physical form of the adhesion component, e.g., layer, and the surface roughness of the support to which the adhesion component binds, for example. In some examples the thickness of the adhesion component in the form of a layer is about 0.5 to about 100 microns, or about 0.5 to about 75 microns, or about 0.5 to about 50 microns, or about 1 to about 100 microns, or about 1 to about 75 microns, or about 1 to about 50 microns, or about 5 to about 100 microns, or about 5 to about 75 microns, or about 5 to about 50 microns, or about 10 to about 100 microns, or about 10 to about 75 microns, or about 10 to about 50 microns, or about 25 to about 100 microns, or about 25 to about 75 microns, or about 25 to about 50 microns, or about 30 to about 100 microns, or about 30 to about 75 microns, or about 30 to about 50 microns, or about 35 to about 75 microns, or about 35 to about 50 microns, for example.

In an example of an ink-printable composition, the support comprises a scrim between two substrate layers and the ink-receiving material is disposed on a surface of one or both of the two substrate layers being bonded thereto by a polymeric composition in accordance with the principles described herein. In another example of an ink-printable composition, the support comprises a substrate layer and an adhesion layer disposed on the substrate layer and the ink-receiving material is disposed on a surface of the adhesion layer resulting from a polymeric composition in accordance with the principles described herein. In another example of an ink-printable composition, the support comprises a scrim between two substrate layers and an adhesion layer disposed on one or both of the two substrate layers and the ink-receiving material is disposed on a surface of the adhesion layer resulting from a polymeric composition in accordance with the principles described herein. In another example of an ink-printable composition, the support comprises a scrim between two adhesion layers and the ink-receiving material is disposed on a surface of each of the adhesion layers resulting from a polymeric composition in accordance with the principles described herein. In another example of an ink-printable composition, the support comprises a woven scrim disposed on an extruded layer with an adhesion layer on a surface of the woven scrim with the ink-receiving material bonded to the surface of the woven scrim by an adhesion layer resulting from a polymeric composition in accordance with the principles described herein.

Some examples in accordance with the principles described herein are directed to an ink-printable composition, which comprises a planar scrim having a first side and a second side, an extruded polymer film on the first side and the second side of the planar scrim and an ink-receiving material extruded on the extruded polymer film on one or both of the first side and the second side of the planar scrim. The ink-receiving material is bound to the extruded polymer film by means of an adhesion layer produced from a polymeric composition in accordance with the principles described herein.

In some examples in accordance with the present disclosure, an ink-printable composition comprises a planar scrim having a first side and a second side, a polymer film on the first side of the planar scrim, an adhesion layer on one or both of the first side and the second side of the planar scrim, and a film of an ink-receiving material on at least the adhesion layer on the second side of the planar scrim. The adhesion layer (sometimes referred to as a tie layer) is produced from a polymeric composition, examples of which are described above.

Fabrication of Ink-Printable Compositions

The ink-printable compositions, or individual components thereof including, but not limited to, adhesion components and ink-receiving layers, can be prepared or formed, for example, by extrusion processes, lamination processes, coating processes including solution coating processes such as, e.g., meyer rod, curtain, slot die, blade, gravure, roll dip, cast, and spray processes. For example, in some examples in accordance with the principles described herein, the ink-receiving layer(s) and various other components of an ink-printable composition, such as, for example, components of the support, and adhesion components, may be formed together by one or more of single extrusion, co-extrusion, extrusion coating, hot melt extrusion, cast extrusion process, modification of cast extrusion or coating operation, lamination, blown extrusion process, film extrusion, and sheet extrusion, for example. The extrusion system may comprise, by way of illustration and not limitation, a vertical single screw extruder or a horizontal single screw extruder, for example. In some examples an adhesion component is formed on the support by an extrusion process where the support is assembled either prior to or during the extrusion process. Following formation of the adhesion component, or concomitantly therewith, the ink-receiving material is formed on a surface of the adhesion component. Such extrusion processes, e.g., co-extrusion, may be employed to assemble other components of the support prior to the extrusion of the ink-receiving layer on the support. As used herein, the terms "extrude" or "extrusion" or "extrusion process(es)" refer to a process(es) wherein the material is heated to a predetermined temperature, which is a temperature at, or above, the processing temperature or melting temperature of the extruded materials, and then deposited on a moving support at a substantially uniform thickness. The extrusion steps of the extrusion processed above may be carried out simultaneously or one or more of the extrusion steps may be carried out independent of other extrusion steps.

As mentioned above, in some examples in accordance with the principles described herein, the ink-printable composition is fabricated using an extruder and an extrusion process, which generally involves melting the material to be extruded, which may be in the form of pellets, beads, flakes, or powder, for example. Depending on the nature of the material to be extruded, the material may also include a liquid such as a plasticizer. The melted material is then run through a die, such as, for example, by applying heat and force to the melted material, to produce an extruded form or a three-dimensional profile shape such as, for example, a film or a sheet. In one example an extruded form of the polymeric composition in accordance with the principles described herein is prepared by subjecting a mixture of the first polymer and the second polymer to an extrusion process. As indicated above, the mixture of the first polymer and the second polymer may be prepared by compounding, or the mixture of the first polymer and the second polymer may be prepared in the extrusion apparatus.

In another example, the ink-printable composition is formed by a single extrusion process wherein a polymeric composition comprising a mixture of the first polymer and the second polymer is extruded onto the surface of a support to form an adhesion layer and an ink-receiving layer is then extruded on a surface of the adhesion layer. The temperature and extrusion speed employed in a particular extrusion process depend on one or more of the nature of the extrusion process, the nature of the polymeric composition, the nature of the ink-receiving material, the nature of the substrate or of other components of the support, and the nature of the extruder, for example.

In another example, the ink-printable composition is formed by co-extruding a polymeric composition, which comprises a mixture of the first polymer and the second polymer, and an ink-receiving layer-forming composition onto the surface of a support. The temperature and extrusion speed employed in a particular extrusion process depend on one or more of the nature of the extrusion process, the nature of the polymeric composition, the nature of the ink-receiving material, the nature of the substrate or of other components of the support, and the nature of the extruder, for example. Co-extrusion is a process wherein two different polymer blends are extruded in two different extruders at the same time and then come in contact at the die and stick together.

As mentioned above, in an example of an ink-printable composition, the support comprises a scrim between two substrate layers and an ink-receiving material is adhered to a surface of one or both of the two substrate layers by means of an adhesion component that results from a polymeric composition in accordance with the principles described herein. A method of preparing the above ink-printable composition comprises extruding the two substrate layers on both sides of the scrim and co-extruding the ink-receiving material and a polymeric composition on a surface of one or both of the two substrate layers.

Some examples in accordance with the principles described herein are directed to a method of preparing an ink-printable composition that comprises a planar scrim, one or more substrate layers, and an adhesion layer. A first substrate layer is extruded on at least a first side of a planar scrim comprising a first side and a second side. An adhesion layer or a second substrate layer is extruded on one of the second side of the planar scrim or a surface of the second substrate layer. An ink-receiving material is extruded on one or both of a surface of the adhesion layer and a surface of a substrate layer. The extrusion steps above may be carried out simultaneously during co-extrusion or one or more of the extrusion steps may be carried out independent of other extrusion steps and may be performed simultaneously or individually.

In an example, the adhesion layer is formed from a polymeric composition that comprises a mixture comprising a first polymer that comprises methyl acrylate residues or ethyl acrylate residues in an amount of about 15% to about 25% by weight of the first polymer, maleic anhydride residues in an amount of about 2% to about 3.5% by weight of the first polymer, and ethylene residues; and a second polymer comprising butyl acrylate residues in an amount of about 5% to about 10% by weight of the second polymer, maleic anhydride residues in an amount of about 3% to about 4% by weight of the second polymer, and ethylene residues. An amount of the first polymer in the mixture is about 60% to about 90% by weight or about 75% to about 85% by weight, or about 60% to about 80% by weight, or about 60% to about 70% by weight, or about 80% by weight.

In some examples, a method of preparing an ink-printable composition in accordance with the principles described herein comprises: (a) forming a first polymer film on the first side of a support comprising a planar scrim; (b) forming an adhesion component on the second side of the support; and (c) forming an ink-receiving material on the second side of the surface of the adhesion component. The adhesion component results from a polymeric composition that comprises a mixture comprising (i) a first polymer that comprises methyl acrylate residues or ethyl acrylate residues in an amount of about 15% to about 25% by weight of the first polymer, maleic anhydride residues in an amount of about 2% to about 3.5% by weight of the first polymer, and ethylene residues; and (ii) a second polymer comprising butyl acrylate residues in an amount of about 5% to about 10% by weight of the second polymer, maleic anhydride residues in an amount of about 3% to about 4% by weight of the second polymer, and ethylene residues. An amount of the first polymer in the mixture is about 60% to about 90% by weight.

In some examples, a method of preparing an ink-printable composition in accordance with the principles described herein comprises: (a) forming an adhesion component on the first and second sides of the support, and (b) forming an ink-receiving material on the first and second sides of the surfaces of the adhesion component. The adhesion component results from a polymeric composition that comprises a mixture comprising (i) a first polymer that comprises methyl acrylate residues or ethyl acrylate residues in an amount of about 15% to about 25% by weight of the first polymer, maleic anhydride residues in an amount of about 2% to about 3.5% by weight of the first polymer, and ethylene residues; and (ii) a second polymer comprising butyl acrylate residues in an amount of about 5% to about 10% by weight of the second polymer, maleic anhydride residues in an amount of about 3% to about 4% by weight of the second polymer, and ethylene residues. An amount of the first polymer in the mixture is about 60% to about 90% by weight.

Some examples in accordance with the principles described herein are directed to a method of preparing an ink-printable composition that comprises a planar scrim having a first side and a second side, an extruded polymer film on the first side of the planar scrim, an adhesion component on the planar scrim, and an ink-receiving material on the adhesion component. Referring to FIG. 1A, a method for preparing an ink-printable composition, in an example by way of illustration and not limitation, comprises extruding a polymer film 44 (as part of a support for easier handling on printing) on at least a second side of planar scrim 40 comprising a first side and a second side, extruding a polymeric composition in the form of an adhesion layer 46 on a free surface (surface not bonded to another member) of planar scrim 40, and extruding an ink-receiving material in the form of an extruded film 48 on a free surface of adhesion layer 46.

Figure 1B:
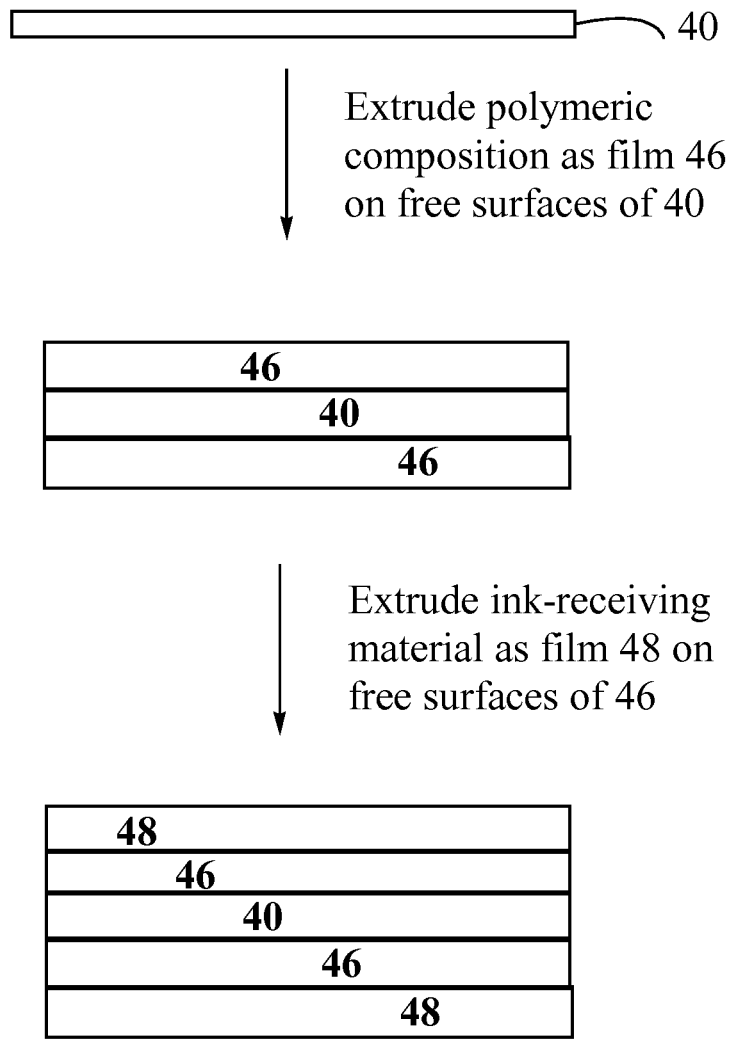
FIG. 1B is a diagram illustrating a method of preparing an ink-printable composition according to an example in accordance with the principles described herein.

Some examples in accordance with the principles described herein are directed to a method of preparing an ink-printable composition that comprises a planar scrim having a first side and a second side, an adhesion component on the first side and the second side of the planar scrim, and an ink-receiving material on the adhesion component. Referring to FIG. 1B, a method for preparing an ink-printable composition, in another example by way of illustration and not limitation, comprises extruding a polymeric composition 46 on first and second sides of planar scrim 40, and extruding an ink-receiving material in the form of an extruded film 48 on free surfaces of the polymeric composition 46.

The extrusion steps above may be carried out simultaneously or one or more of the extrusion steps may be carried out independent of other extrusion steps. In one example, polymeric composition 46 comprises a mixture that comprises a first polymer comprising methyl acrylate residues or ethyl acrylate residues in an amount of about 15% to about 25% by weight of the first polymer, maleic anhydride residues in an amount of about 2% to about 3.5% by weight of the first polymer, and ethylene residues; and a second polymer comprising butyl acrylate residues in an amount of about 5% to about 10% by weight of the second polymer, maleic anhydride residues in an amount of about 3% to about 4% by weight of the second polymer, and ethylene residues, wherein an amount of the first polymer in the mixture is about 60% to about 90% by weight or about 75% to about 85% by weight, or about 80% by weight.

Figure 2:
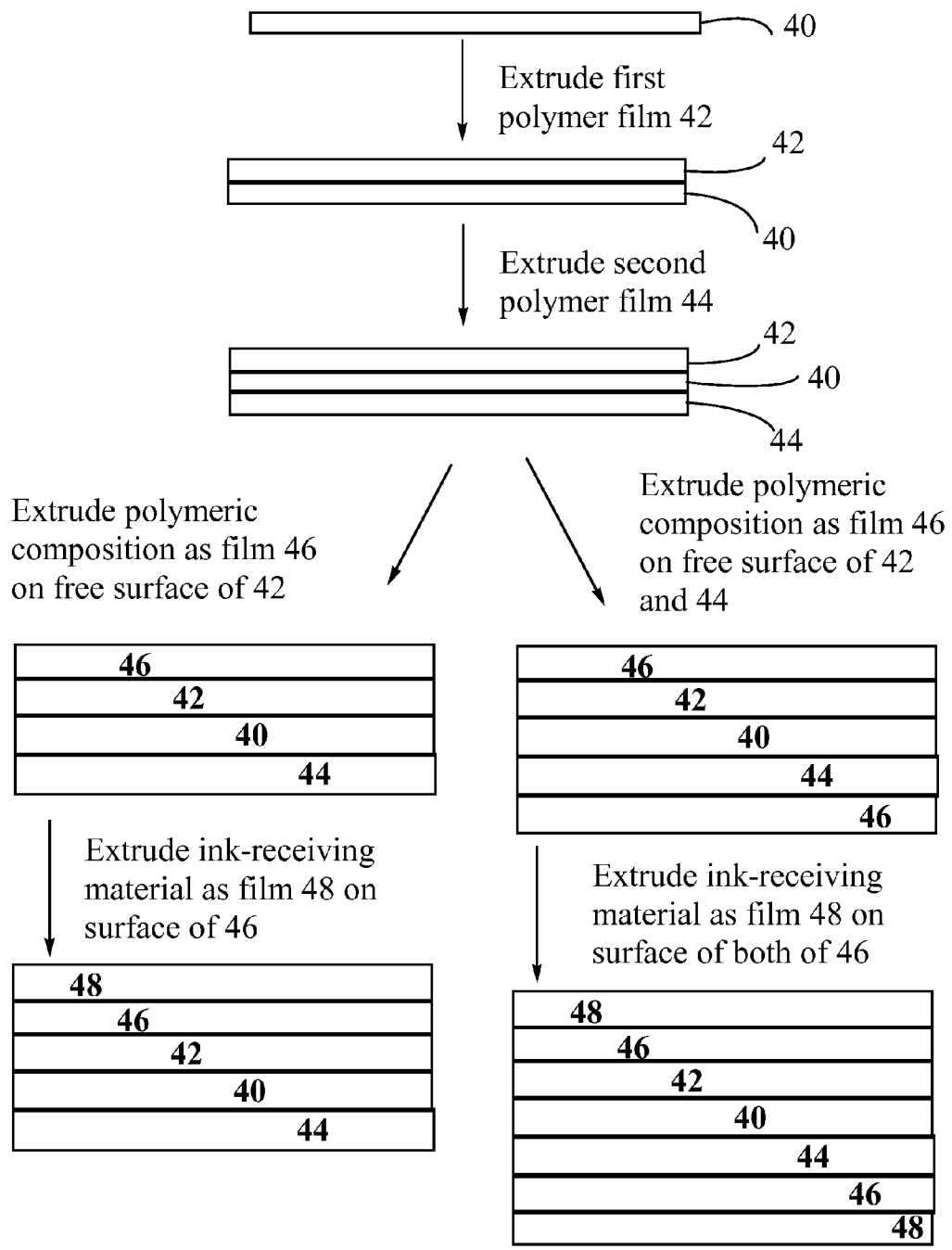
FIG. 2 is a diagram illustrating a method of preparing an ink-printable composition according to another example in accordance with the principles described herein.

Referring to FIG. 2, a method for preparing an ink-printable composition, in another example by way of illustration and not limitation, comprises extruding a first polymer film 42 on at least a first side of planar scrim 40 comprising a first side and a second side, and optionally extruding a second polymer film 44 on the second side of planar scrim 40. The composition of the second polymer film 44 may be the same as or different from the composition of first polymer film 42. The method further comprises extruding a polymeric composition in the form of an adhesion layer 46 on one or both of a free surface of first polymer film 42 and a free surface of second polymer film 44 ('free surface' is a surface not bonded to another member), such that the adhesion layer 46 is on one or both of the first side and the second side of planar scrim 40. The method further comprises extruding an ink-receiving material in the form of an extruded film 48 on the free surface of adhesion layer 46. The extrusion steps above may be carried out simultaneously or one or more of the extrusion steps may be carried out independent of other extrusion steps. In an example, the adhesion layer polymeric composition 46 comprises a mixture that comprises a first polymer comprising methyl acrylate residues or ethyl acrylate residues in an amount of about 15% to about 25% by weight of the first polymer, maleic anhydride residues in an amount of about 2% to about 3.5% by weight of the first polymer, and ethylene residues; and a second polymer comprising butyl acrylate residues in an amount of about 5% to about 10% by weight of the second polymer, maleic anhydride residues in an amount of about 3% to about 4% by weight of the second polymer, and ethylene residues, wherein an amount of the first polymer in the mixture is about 60% to about 90% by weight or about 75% to about 85% by weight, or about 80% by weight.

Figure 3:
FIG. 3 illustrates in macroscale a schematic of an adhesion layer formed from a polymeric composition according to another example in accordance with the principles described herein.

FIG. 3 illustrates in macroscale a schematic of an example of an adhesion layer 12 in accordance the principles described herein formed from an example of a polymeric composition in accordance with the principles described herein.

Figure 4:
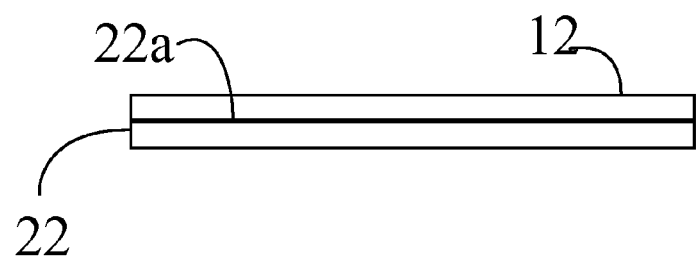
FIG. 4 illustrates in macroscale a schematic of an adhesion layer formed from a polymeric composition according to another example in accordance with the principles described herein.

FIG. 4 illustrates in macroscale a schematic of an example of an adhesion layer 12 in accordance with the principles described herein disposed on at least surface 22a of support 22, which may comprise "n" number (n=1, 2, ... ) of layers such as, for example, one or more substrate layers, one or more scrims, one or more additional adhesion layers, and one or more moisture barriers. At least one of the layers of support 22 is a substrate layer or a scrim.

Examples of Ink-Printable Compositions

Examples of ink-printable compositions in accordance with the principles described herein are discussed below by way of illustration and not limitation. The various examples described herein have broad application and any number of ink-printable compositions may be fabricated from an adhesion composition based on the principles described herein.

Figure 5:
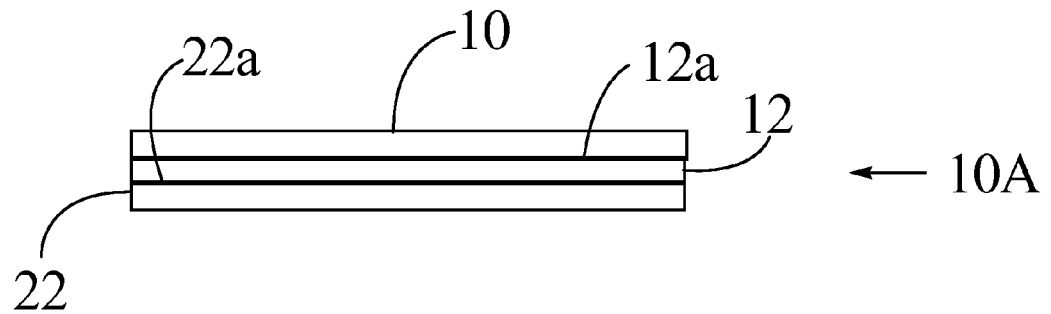
FIG. 5 illustrates in macroscale a schematic of an ink-printable composition according to another example in accordance with the principles described herein.

FIG. 5 illustrates in macroscale a schematic of an example of an ink-printable composition in accordance with the principles described herein. Ink-printable composition 10A comprises ink-receiving layer 10 disposed on a surface 12a of adhesion layer 12 on surface 22a of support 22, which may comprise "n" number of layers such as, for example, one or more substrate layers, one or more scrims, one or more additional adhesion layers, and one or more moisture barriers, for example. Adhesion layer 12 provides for adherence of ink-receiving layer 10 to surface 22a of support 22. At least one of the layers of support 22 is a substrate layer or a scrim.

Figure 6:
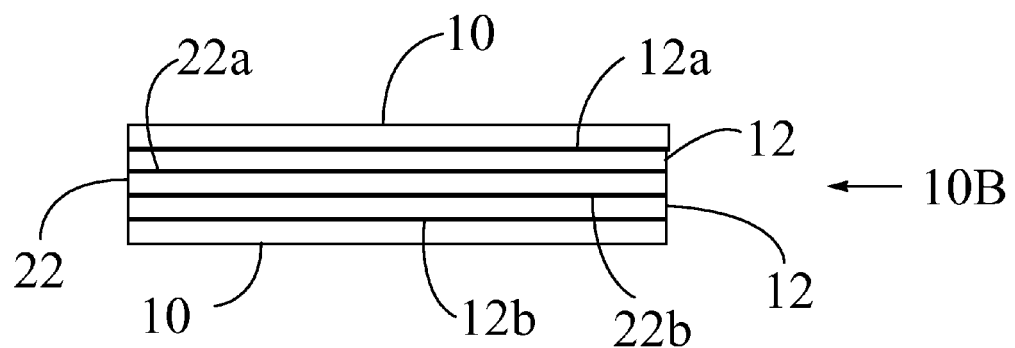
FIG. 6 illustrates in macroscale a schematic of an ink-printable composition according to another example in accordance with the principles described herein.

FIG. 6 illustrates in macroscale a schematic of an example of another ink-printable composition in accordance with the principles described herein. Ink-printable composition 10B comprises ink-receiving layer 10 disposed on a surface 12a of adhesion layer 12 on surface 22a of support 22, which may comprise "n" number of layers such as, for example, one or more substrate layers, one or more scrims, one or more additional adhesion layers, one or more oxygen barriers, one or more vapor barriers, and one or more moisture barriers, for example, and ink-receiving layer 10 disposed on a surface 12b of adhesion layer 12, which is disposed on surface 22b of support 22. Adhesion layers 12 provide for adherence of ink-receiving layer 10 to surfaces 22a and 22b, respectively, of support 22. At least one of the layers of support 22 is a substrate layer or a scrim.

Another example of an ink-printable composition in accordance with the principles described herein is an ink-printable composition comprising (a) a planar scrim having a first side and a second side; (b) a polymer film on the first side of the planar scrim; (c) an adhesion component on the second side of the planar scrim; and (d) a film of an ink-receiving material on the adhesion component on the second side of the planar scrim. The adhesion component results from a polymeric composition that comprises a mixture comprising (i) a first polymer that comprises methyl acrylate residues or ethyl acrylate residues in an amount of about 15% to about 25% by weight of the first polymer, maleic anhydride residues in an amount of about 2% to about 3.5% by weight of the first polymer, and ethylene residues; and (ii) a second polymer comprising butyl acrylate residues in an amount of about 5% to about 10% by weight of the second polymer, maleic anhydride residues in an amount of about 3% to about 4% by weight of the second polymer, and ethylene residues. An amount of the first polymer in the mixture is about 60% to about 90% by weight.

Figure 7:
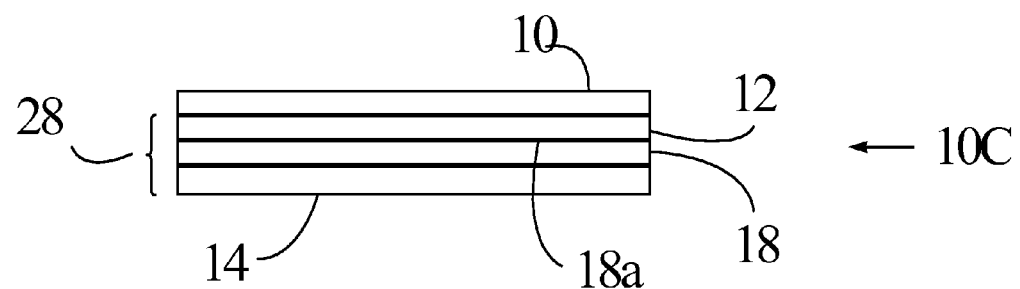
FIG. 7 illustrates in macroscale a schematic of an ink-printable composition according to another example in accordance with the principles described herein.

FIG. 7 illustrates in macroscale a schematic of another example of an ink-printable composition in accordance with the principles described herein. Ink-printable composition 10C comprises ink-receiving layer 10 disposed on support 28, which comprises adhesion layer 12, scrim 18 and substrate layer 14. Adhesion layer 12 results from a polymeric composition in accordance with the principles described herein and provides for adherence of ink-receiving layer 10 to surface 18a of scrim 18.

Figure 8:
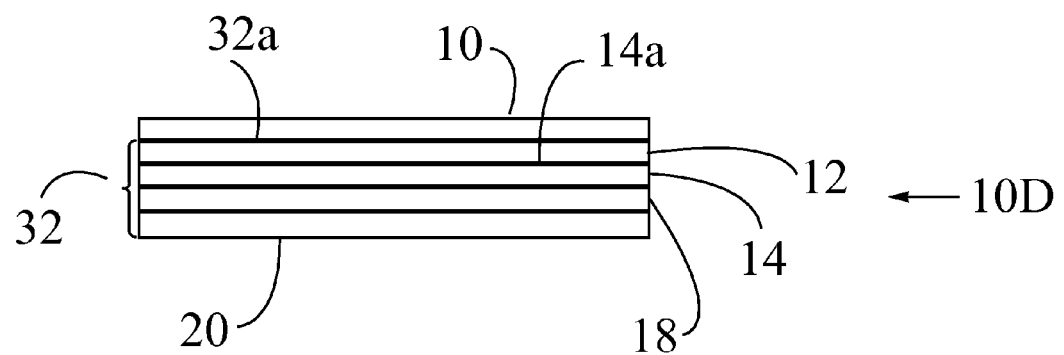
FIG. 8 illustrates in macroscale a schematic of an ink-printable composition according to another example in accordance with the principles described herein.

FIG. 8 illustrates in macroscale a schematic of another example of an ink-printable composition in accordance with the principles described herein. Ink-printable composition 10D comprises ink-receiving layer 10 disposed on surface 32a of support 32, which comprises adhesion layer 12, substrate layer 14, scrim 18 and substrate layer 20. Adhesion layer 12 results from a polymeric composition in accordance with the principles described herein and provides for adherence of ink-receiving layer 10 to surface 14a of substrate layer 14.

Another example of an ink-printable composition in accordance with the principles described herein is an ink-printable composition comprising (a) a planar scrim having a first side and a second side; (b) an adhesion component on the first and second sides of the planar scrim; and (c) a film of an ink-receiving material the free surfaces of the adhesion component on the first and second sides of the planar scrim. The adhesion component results from a polymeric composition that comprises a mixture comprising (i) a first polymer comprising methyl acrylate residues or ethyl acrylate residues in an amount of about 15% to about 25% by weight of the first polymer, maleic anhydride residues in an amount of about 2% to about 3.5% by weight of the first polymer, and ethylene residues; and (ii) a second polymer comprising butyl acrylate residues in an amount of about 5% to about 10% by weight of the second polymer, maleic anhydride residues in an amount of about 3% to about 4% by weight of the second polymer, and ethylene residues. An amount of the first polymer in the mixture is about 60% to about 90% by weight.

Figure 9:
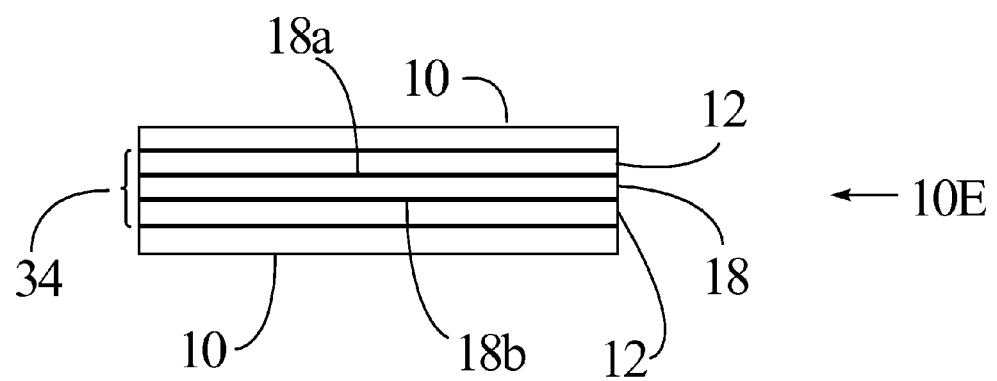
FIG. 9 illustrates in macroscale a schematic of an ink-printable composition according to another example in accordance with the principles described herein.

FIG. 9 illustrates in macroscale a schematic of another example of an ink-printable composition in accordance with the principles described herein. Ink-printable composition 10E comprises ink-receiving layers 10 disposed on opposing surfaces of support 34, which comprises adhesion layers 12, and scrim 18. Adhesion layers 12 result from a polymeric composition in accordance with the principles described herein and provide for adherence of ink-receiving layers 10 to opposing surfaces 18a and 18b of scrim 18.

Uses of Ink-Printable Compositions

Examples of polymeric compositions in accordance with the principles described herein may be employed to bond various materials to one another. The materials may be in the form of sheets, layers, woven and non-woven scrims, for example. The types of materials include, for example, hydrophobic materials. As mentioned above, the polymeric compositions in accordance with the principles described herein exhibit at least the characteristic of excellent bonding strength, particularly for materials that are hydrophobic in nature. In some examples the polymeric compositions are employed to bond together two or more components of ink-printable compositions.

Examples of the present ink-printable compositions may be employed as printing media for use with, for example, inkjet ink compositions. Such compositions include, for example, latex inkjet ink and UV-curable inkjet inks, and combinations thereof. The phrase "latex inkjet ink" refers to an ink composition containing polymeric latex. The phrase "UV-curable inkjet ink" means an ink composition containing UV-curable materials. The phrase "inkjet ink" means an ink that is suited for use in one or both of an inkjet device and an inkjet printing process.

In an example the inkjet ink comprises one or more colorants that impart the desired color to the printed item. Such colorants include, for example, dyes, and pigments. The colorant is generally present in the inkjet ink in an amount required to produce the desired contrast and readability. Pigments that can be used may be organic or inorganic and include, for example, self-dispersed pigments and non self-dispersed pigments. The pigment can be of any color including, but not limited to, black, blue, brown, cyan, green, white, grey, violet, magenta, red, orange and yellow, as well as spot colors from mixtures thereof.

Examples of organic pigments that may be present in an inkjet ink composition include, by way of illustration and not limitation, perylenes, phthalocyanine pigments (for example, phthalo green, phthalo blue), cyanine pigments (Cy3, Cy5, and Cy7), naphthalocyanine pigments, nitroso pigments, monoazo pigments, diazo pigments, diazo condensation pigments, basic dye pigments, alkali blue pigments, blue lake pigments, phloxin pigments, quinacridone pigments, lake pigments of acid yellow 1 and 3, isoindolinone pigments, dioxazine pigments, carbazole dioxazine violet pigments, alizarine lake pigments, vat pigments, phthaloxy amine pigments, carmine lake pigments, tetrachloroisoindolinone pigments, perinone pigments, thioindigo pigments, anthraquinone pigments and quinophthalone pigments, and mixtures of two or more of the above and derivatives of the above.

Inorganic pigments that may be present in an inkjet ink composition, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides, and mixtures of two or more thereof.

In many examples the colorant is suspended, dispersed or dissolved in a suitable ink vehicle. As used herein, "ink vehicle" is defined to include any liquid composition that is used to carry colorants, including pigments, to an ink-receiving material. A wide variety of liquid vehicles may be used. In some examples the liquid vehicle may include one or more of a variety of different agents, including without limitation, surfactants, solvents and co-solvents, buffers, biocides, viscosity modifiers, sequestering agents, stabilizing agents, and water, for example.

The ink-printable compositions disclosed herein may be used to prepare display items using any suitable printer such as, for example, an inkjet printer that is ordinarily used for inkjet printing. Using an appropriate printer, ink may be applied to the ink-receiving material of an example of an ink-printable composition to create a desired display comprising a printed image with subsequent drying of the image following application of the ink.

For the above uses, examples of supports include, but are not limited to, resin coated papers (or photo-base papers), papers, clear films, translucent films, scrim banners (woven and non-woven), other types of banners, coated papers, fabrics, art papers (e.g., water color paper), and plastic film, for example. As mentioned above, one of the components of the support chosen may comprise a porous or non-porous surface. In an example, at least one of the components of the support is paper. In another example at least one of the components of the support is a scrim banner, which is a woven-core of polymer tapes (LDPE, HDPE and polyester, for example) with an extruded coating layer locking them together. Such products are available from PGI Corporation (Ontario, Canada), Engineered Coated Products (BC, Canada), Heytex (Germany), Maiweave (Springfield, Ohio), or Interwrap Inc. (Vancouver, Wash.).

DEFINITIONS

The following provides definitions for terms and phrases used above, which were not previously defined.

The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited as well as fractions of the numbers 2 to 50. As used herein, the singular forms "a", "an" and "the" include plural referents unless the content clearly dictates otherwise. In some instances, "a" or "an" as used herein means "at least one" or "one or more." The designations "first" and "second" are used solely for the purpose of differentiating between two items such as "first polymer" and "second polymer" and are not meant to imply any sequence or order or importance to one item over another or any order of operation, for example.

EXAMPLES

Parts and percentages are by weight unless indicated otherwise.

Figure 10:
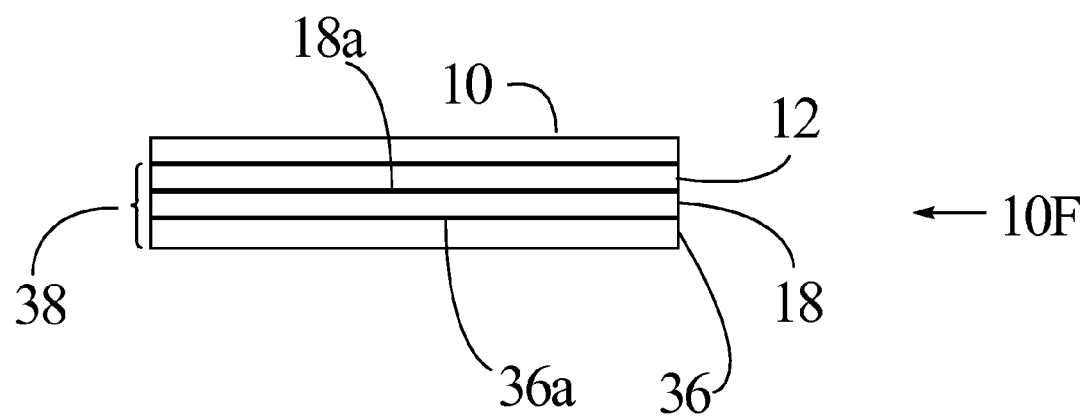
FIG. 10 illustrates in macroscale a schematic of an ink-printable composition according to another example in accordance with the principles described herein.

Referring to FIG. 10, examples of ink-printable compositions (10F) were prepared by an extrusion process and comprised an image-receiving layer or ink-receiving layer (IRL) (10) adhered to a surface (18a) of a woven HDPE layer (18) using a polymeric composition to form an adhesion layer (12), which together with woven HDPE layer (18) disposed on a surface (36a) of an extruded HDPE layer (36) forms a support (38).

Example 1

An amount of 400 grams (g) of LOTADER® 5500 polymer (Arkema Canada, Inc.) (a terpolymer of composition of 77.2% ethylene residues, 20% ethyl acrylate residues and 2.8% maleic anhydride residues with melt index number at 20) and 100 g of LOTADER® 4210 polymer (Arkema Canada, Inc.) (a terpolymer of 90.2% of ethylene residues, 6% of butyl acrylate residues and 3.8% of maleic anhydride residues with a melt index number at 9) were mixed well in a mixing bag prior to placing the mixture in the extruder. The mixture was extruded as a film (adhesion layer 12) onto one side of a support 38 (see FIG. 10), which comprised a scrim of woven HDPE (18) having a thickness of about 130 microns disposed on an extruded HDPE layer (36) having a thickness of about 55 microns. The temperature during the extrusion was controlled at 260 to 280° C. The thickness of the extruded film of polymeric composition was controlled at about 25 to about 35 microns. Next, an IRL 10, which was formed from an ink-receiving layer-forming composition (a copolymer of ethylene and vinyl alcohol and a terpolymer of ethylene, vinyl acetate and maleic anhydride) was bonded to the adhesion layer by a process wherein the ink receiving layer-forming composition was extruded onto the adhesion layer by means of an extrusion coating process. Then, the resulting product (ink-printable composition 10F) was subjected to adhesion testing wherein adhesion to the scrim of woven HDPE (18) and adhesion to the IRL (10) were tested by an Instron device twenty four hours after the extrusion coating had been made.

Example 2

An example was carried out in a manner similar to that of Example 1 using 320 g of LOTADER® 5500 polymer, 80 g of LOTADER® 3210 terpolymer (Arkema Canada, Inc.) (composition of 90.9% of ethylene residues, 6% of butyl acrylate residues and 3.1% of maleic anhydride residues with a melt index number at 5) in place of LOTADER® 4210, and 100 g of TiO$_2$ compounded with LDPE.

Example 3

An example was carried out in a manner similar to that of Example 1 using 100 g of LOTADER® 3210 terpolymer (Arkema Canada, Inc.) in place of LOTADER® 4210.

Example 4

As controls, the experiment described in Example 1 was repeated using the following materials individually to bond the IRL to the support:
  4a—LOTADER® 5500,
  4b—LOTADER® 4210, and
  4c—LOTADER® 3210.
In addition, for purposes of comparison the following materials were also used individually to bond the IRL to the support in an experiment carried out as described in Example 1:
  4d—OREVAC® 18380 (Arkema Canada, Inc.) (maleic anhydride modified linear LDPE residues with melt index number at 4);
  4e—OREVAC® OE825 (Arkema Canada, Inc.) (maleic anhydride modified linear LDPE residues with melt index number at 1.7);
  4f—OREVAC® 9304 (composition of 74.84% ethylene residues, 25% vinyl acetate residues and 0.16% maleic anhydride residues with melt index number at 7.4);
  4g—LOTADER® 6200 (Arkema Canada, Inc.) (composition of 90.7% ethylene residues, 6.5% ethyl acrylate residues and 2.8% maleic anhydride residues with melt index number at 40); and
  4h—ELVALOY® AC 1820 (DuPont, Wilmington, Del.) (composition of 80% ethylene residues, 20% methyl acrylate residues with melt index number at 8).

The results of the above examples and tests are summarized in Table 1 below where the ranking is based on a scale of 1 to 5 where 1 is the best and 5 is the worst. A number of 3 or above in one or both categories is considered unacceptable.

TABLE 1

| Film Example | Adhesion to woven HDPE scrim | Adhesion to ink-receiving layer |
| --- | --- | --- |
| 1 | 1 | 1 |
| 2 | 1 | 2 |
| 3 | 1 | 1 |
| 4a | 3 | 1 |
| 4b | 1 | 4 |
| 4c | 1 | 4 |
| 4d | 5 | 5 |
| 4e | 5 | 5 |
| 4f | 5 | 4 |
| 4g | 3 | 4 |
| 4h | 4 | 4 |

The results in Table 1 illustrate that only the films produced in Examples 1-3, which are in accordance with the principles described herein, yielded good results in the above adhesion testing categories, as mentioned above.

Although the foregoing examples have been described in some detail by way of illustration and example for purposes of clarity of understanding, it will be readily apparent to those skilled in the art in light of the teachings herein that certain changes and modifications may be made thereto without departing from the spirit or scope of the appended claims. Furthermore, the foregoing description, for purposes of explanation, used specific nomenclature to provide a thorough understanding of the principles disclosed herein. However, it will be apparent to one skilled in the art that the specific details are not required in order to practice the principles described herein. Thus, the foregoing descriptions of specific examples in accordance with the principles described herein are presented for purposes of illustration and description; they are not intended to be exhaustive or to limit the disclosure to the precise forms disclosed. Moreover, examples herein are intended to be illustrative only and are presented for discussion purposes and not by way of limitation. Many modifications and variations are possible in view of the above teachings. The examples were chosen and described in order to explain the principles disclosed herein and their practical applications and to thereby enable others skilled in the art to utilize these principles.

What is claimed is:

1. A composition comprising a mixture that comprises:
   (i) a first polymer comprising methyl acrylate residues or ethyl acrylate residues in an amount of about 15% to about 25% by weight of the first polymer, maleic anhydride residues in an amount of about 2% to about 3.5% by weight of the first polymer, and ethylene residues; and
   (ii) a second polymer comprising butyl acrylate residues in an amount of about 5% to about 10% by weight of the second polymer, maleic anhydride residues in an amount of about 3% to about 4% by weight of the second polymer, and ethylene residues, wherein an amount of the first polymer in the mixture is about 60% to about 90% by weight.

2. The composition according to claim 1, wherein the first polymer comprises ethyl acrylate residues in an amount of about 17% to about 20% by weight, maleic anhydride residues in an amount of about 2.7% to about 2.9% by weight, and ethylene residues in an amount of about 77% to about 80.5% by weight.

3. The composition according to claim 1, wherein the second polymer comprises butyl acrylate residues in an amount of about 5% to about 7% by weight, maleic anhydride residues in an amount of about 3.0% to 4.0% by weight, and ethylene residues in an amount of about 90% to about 91% by weight.

4. The composition according to claim 1, wherein an amount of the first polymer in the mixture is about 75% to about 85% by weight.

5. An ink-printable composition comprising an ink-receiving material and a support, wherein the ink-receiving material is associated with the support using the composition of claim 1.

6. The ink-printable composition according to claim 5, wherein a composition of the support is selected from the group consisting of polyethylene, polypropylene, polymethylpentene, polybutylene, polyethylene terephthalate, polystyrene, polycarbonate, polyamide, and cellulose, and combinations of two or more thereof.

7. The ink-printable composition according to claim 5, wherein a composition of the support comprises one or both of low density polyethylene and high density polyethylene.

8. An ink-printable composition comprising an ink-receiving material and a support, wherein the support comprises one or both of a scrim and at least one substrate layer, and wherein the ink-receiving material is associated with a surface of the scrim or a surface of the at least one substrate layer using the composition of claim 1.

9. An ink-printable composition comprising:
   (a) a planar scrim having a first side and a second side;
   (b) an adhesion component on one or both of the first side and the second side of the planar scrim, wherein the adhesion component results from a polymeric composition that comprises a mixture comprising:
      (i) a first polymer comprising methyl acrylate residues or ethyl acrylate residues in an amount of about 15% to about 25% by weight of the first polymer, maleic anhydride residues in an amount of about 2% to about 3.5% by weight of the first polymer, and ethylene residues; and
      (ii) a second polymer comprising butyl acrylate residues in an amount of about 5% to about 10% by weight of the second polymer, maleic anhydride residues in an amount of about 3% to about 4% by weight of the second polymer, and ethylene residues, wherein an amount of the first polymer in the mixture is about 60% to about 90% by weight; and
   (c) an ink-receiving material on the adhesion component on one or both of the first side and the second side of the planar scrim.

10. The ink printable composition according to claim 9, wherein the adhesion component is on both the first side and the second side of the planar scrim.

11. The ink printable composition according to claim 9, wherein the adhesion component is on the first side of the planar scrim and a polymer layer is on the second side of the planar scrim.

12. The ink-printable composition according to claim 11, wherein one or both of the planar scrim and the polymer layer comprises one or both of low density polyethylene and high density polyethylene.

13. The ink-printable composition according to claim 9, wherein the first polymer comprises a polymer comprising ethyl acrylate residues in an amount of about 17% to about 20% by weight, maleic anhydride residues in an amount of about 2.7% to about 2.9% by weight, and ethylene residues in an amount of about 77% to about 80.5% by weight.

14. The ink-printable composition according to claim 9, wherein the second polymer comprises a polymer comprising butyl acrylate residues in an amount of about 5% to about 7% by weight, maleic anhydride residues in an amount of about 3.0% to 4.0% by weight, and ethylene residues in an amount of about 90% to about 91% by weight.

15. A method of preparing an ink-printable composition, the method comprising:
   (a) forming an adhesion component on one or both of a first side and a second side of a support comprising a planar scrim, wherein the adhesion component results from a polymeric composition that comprises a mixture comprising:
      (i) a first polymer comprising methyl acrylate residues or ethyl acrylate residues in an amount of about 15% to about 25% by weight of the first polymer, maleic anhydride residues in an amount of about 2% to about 3.5% by weight of the first polymer, and ethylene residues; and (ii) a second polymer comprising butyl acrylate residues in an amount of about 5% to about 10% by weight of the second polymer, maleic anhydride residues in an amount of about 3% to about 4% by weight of the second polymer, and ethylene residues, wherein an amount of the first polymer in the mixture is about 60% to about 90% by weight; and (b) forming an ink-receiving material on the adhesion component on one or both of the first side and the second side of the support.

16. The method according to claim 15, wherein the adhesion component is formed on both the first and second side of the support.

17. The method according to claim 15, wherein the adhesion component is formed on the first side of the support, and wherein a polymer layer is formed on the second side of the support.

18. A composition comprising a mixture that comprises:
(i) a first polymer comprising methyl acrylate residues or ethyl acrylate residues in an amount of about 15% to about 25% by weight of the first polymer, maleic anhydride residues in an amount of about 2% to about 3.5% by weight of the first polymer, and ethylene residues;

(ii) a second polymer comprising butyl acrylate residues in an amount of about 5% to about 10% by weight of the second polymer, maleic anhydride residues in an amount of about 3% to about 4% by weight of the second polymer, and ethylene residues; and (iii) a pigment-LDPE composition comprising about 30% to about 80% of pigment by weight, wherein an amount of the first polymer in the mixture is about 50% to about 70% by weight.

19. The composition according to claim 18, wherein the pigment-LDPE composition is $TiO_2$-LDPE comprising about 65% to about 75% of $TiO_2$ by weight, and wherein the amount of the first polymer in the mixture is about 62% to about 66% by weight, the amount of the second polymer in the mixture being about 14% to about 18% by weight, and the amount of the $TiO_2$-LDPE composition in the mixture being about 18% to about 22% by weight.

* * * * *